(12) United States Patent
Thomas

(10) Patent No.: US 8,876,509 B2
(45) Date of Patent: Nov. 4, 2014

(54) CRYOGENIC COOLING SYSTEM

(76) Inventor: Michael Thomas, St. Clair, MO (US)

( * ) Notice: Subject to any disclaimer, the term of this patent is extended or adjusted under 35 U.S.C. 154(b) by 343 days.

(21) Appl. No.: 13/303,018

(22) Filed: Nov. 22, 2011

(65) Prior Publication Data
US 2012/0067078 A1 Mar. 22, 2012

Related U.S. Application Data

(62) Division of application No. 11/941,930, filed on Nov. 17, 2007, now Pat. No. 8,287,786.

(60) Provisional application No. 60/889,139, filed on Feb. 9, 2007, provisional application No. 60/866,538, filed on Nov. 20, 2006, provisional application No. 60/866,279, filed on Nov. 17, 2006.

(51) Int. Cl.
| | |
|---|---|
| *B28B 5/00* | (2006.01) |
| *B29C 71/02* | (2006.01) |
| *F25D 17/00* | (2006.01) |
| *B29C 47/00* | (2006.01) |
| *B29C 47/88* | (2006.01) |
| *B29C 47/90* | (2006.01) |
| *B29C 47/08* | (2006.01) |
| *B29C 35/16* | (2006.01) |

(52) U.S. Cl.
CPC ......... *B29C 47/882* (2013.01); *B29C 2035/165* (2013.01); *B29C 47/0023* (2013.01); *B29C 47/0016* (2013.01); *B29C 2035/1616* (2013.01); *B29C 47/903* (2013.01); *B29C 47/0893* (2013.01)
USPC ................ 425/72.1; 425/67; 425/68; 425/71; 425/73; 425/74; 425/404; 62/62; 62/63; 62/64; 62/186; 62/378; 62/380; 264/28; 264/237

(58) Field of Classification Search
None
See application file for complete search history.

(56) References Cited

U.S. PATENT DOCUMENTS

| | | | |
|---|---|---|---|
| 3,374,831 A | | 3/1968 | Sieverding |
| 3,558,753 A | * | 1/1971 | Edlin ............................... 264/54 |
| 3,982,873 A | * | 9/1976 | Graeber et al. ............... 425/404 |
| 4,626,183 A | * | 12/1986 | Shirai et al. ..................... 425/68 |
| 4,755,118 A | | 7/1988 | Ondush et al. |
| 6,009,719 A | | 1/2000 | Ochs |
| 6,363,730 B1 | | 4/2002 | Thomas et al. |
| 6,389,828 B1 | | 5/2002 | Thomas |
| 6,620,354 B1 | | 9/2003 | Bessemer et al. |
| 6,622,496 B2 | | 9/2003 | Cheng et al. |
| 6,658,864 B2 | | 12/2003 | Thomas et al. |
| 7,017,352 B2 | | 3/2006 | Hutchison et al. |
| 7,357,617 B2 | | 4/2008 | Haga et al. |
| 2004/0216470 A1 | | 11/2004 | Thomas et al. |
| 2005/0031724 A1 | | 2/2005 | Pabedinskas |
| 2005/0132746 A1 | | 6/2005 | Brugerolle et al. |
| 2006/0010884 A1 | | 1/2006 | Hutchison et al. |
| 2006/0012066 A1 | | 1/2006 | Hutchison et al. |

\* cited by examiner

*Primary Examiner* — Jeffrey Wollschlager
(74) *Attorney, Agent, or Firm* — Doster Greene, LLC

(57) ABSTRACT

An apparatus according to various embodiments can be configured to use a cryogen for cooling articles, particularly having applications for chilling extrusions. The apparatus removes thermal energy from an article by conductive and convective heat transfer. The apparatus allows for heat transfer from an outer surface of an article, and from an inner surface of the article.

6 Claims, 10 Drawing Sheets

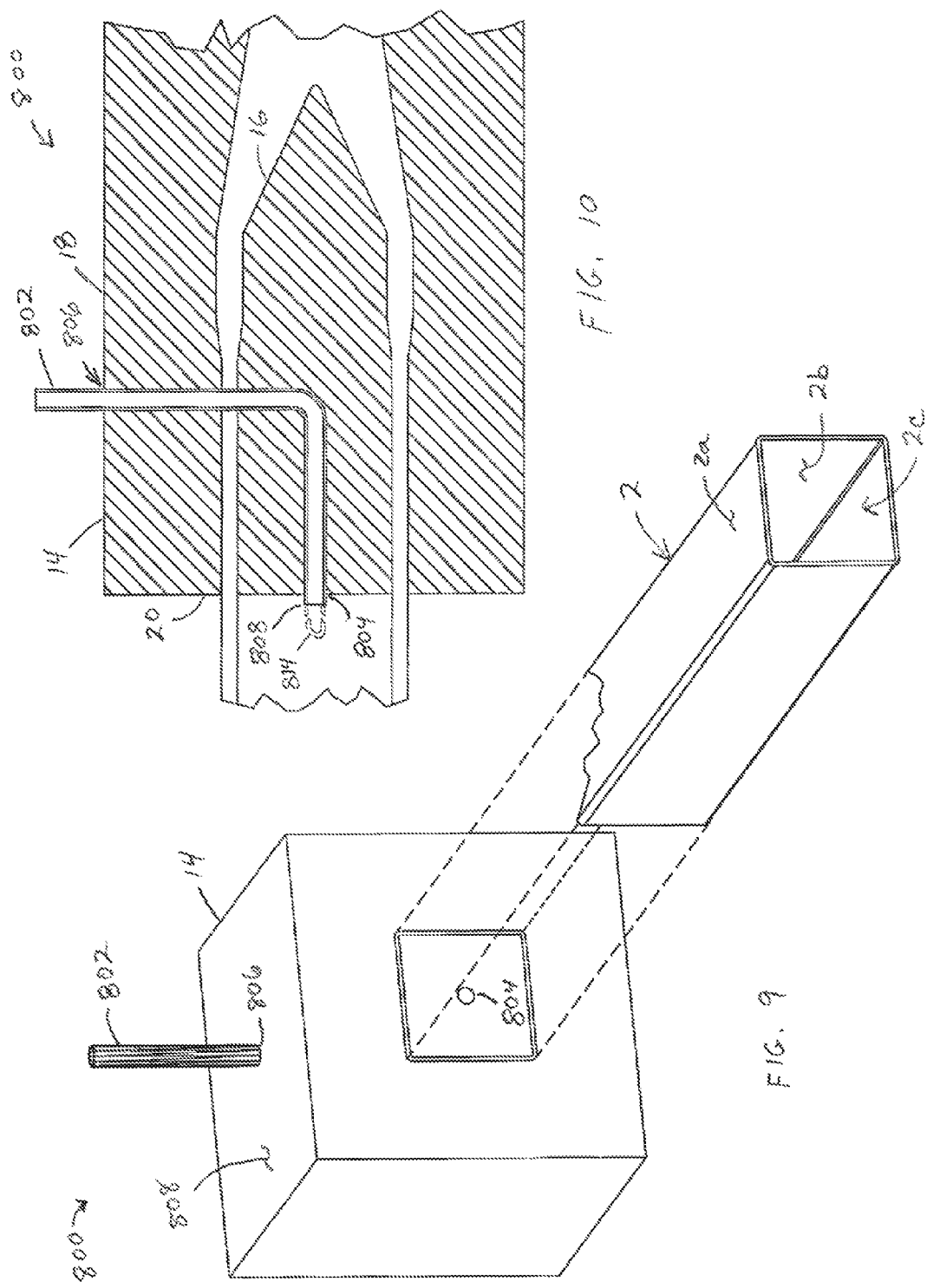

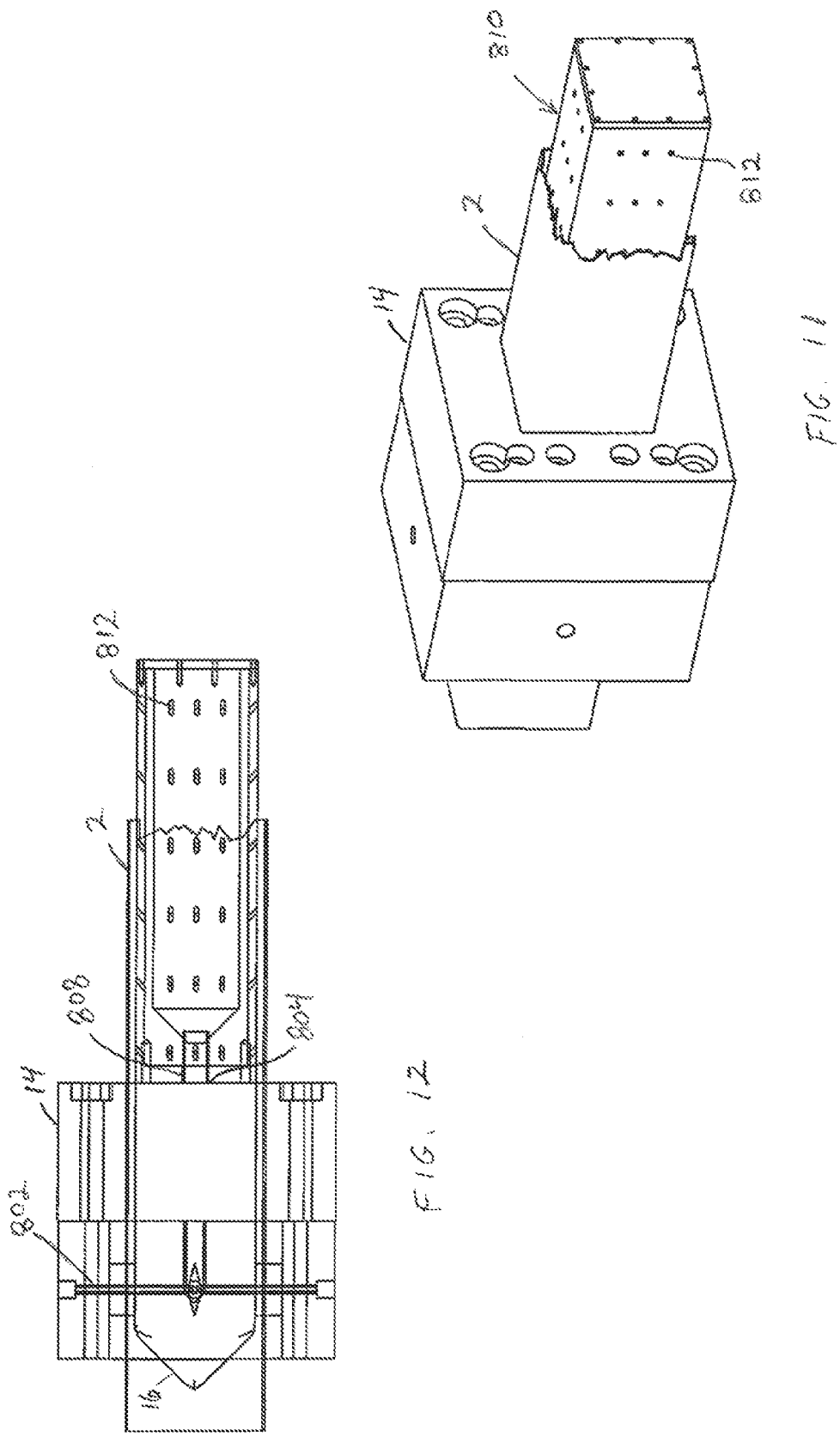

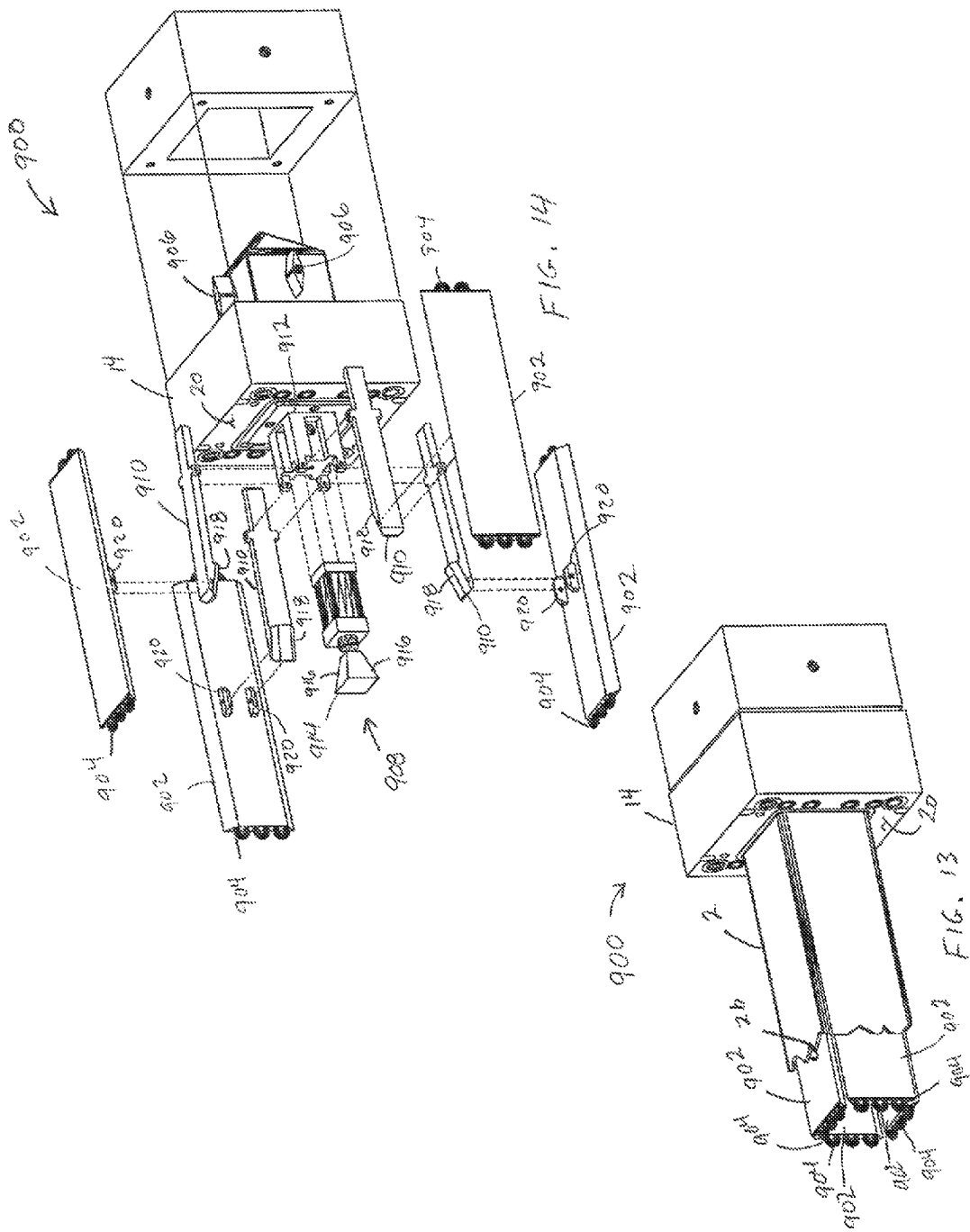

CRYOGENIC COOLING SYSTEM

This application is a divisional of application Ser. No. 11/941,930, filed Nov. 17, 2007, now U.S. Pat. No. 8,287,786, which claims the benefit of priority to U.S. Provisional Patent Application Ser. No. 60/889,139, filed Feb. 9, 2007; U.S. Provisional Patent Application Ser. No. 60/866,538, filed Nov. 20, 2006; and U.S. Provisional Patent Application Ser. No. 60/866,279, filed Nov. 17, 2006.

BACKGROUND

The present disclosure relates generally to a method and apparatus for cooling an extrudate or extruded articles. Specifically, the present disclosure relates to circulating a cryogen through a cooling chamber including sizing and/or calibration tools, through a hollow in the article itself or a combination of the aforementioned to cool an extrudate. Additionally, many other applications of the invention will become apparent to those skilled in the art upon a review of the following specification and drawings.

Extruded materials, for example products comprising plastics, rubbers, wood composites, etc., are formed by mixing raw materials under high temperature and pressure and passing the mixture through a die to form the final shape. The extruded material, or extrudate, is subject to deformation after leaving the extruder because of the plastic material properties at high temperature. The extrudate must be cooled to provide rigidity for further operation. If the extrudate is not quickly and effectively cooled, the extrudate may deform, leading to rejection of the extruded products.

Certain continuously extruded materials, e.g., rubber products, plastic products, metal products, wood composites, must be cooled after passing through the extrusion operation in order to prevent deformation. In conventional extrusion operations, the extruded materials, be it hose, pipe, rod, bar or any other shape may deform from its own weight if the temperature was not decreased rapidly after leaving the extruder. Cooling the product rapidly creates, at least, a minimum amount of rigidity in the extrudate such that the manufacturer can cut, stack or otherwise handle the extrudate without unwanted deformation. If the product is not cooled effectively, and quickly, the resultant deformation can lead to excessive rates of rejection of the manufactured or extruded product. Further, the rate at which the extrudate is cooled directly affects the rate at which product may be produced. In other words, the faster an extrudate is cooled, the faster the end product can be produced.

Historically, cool water systems have been utilized as the primary medium for cooling articles, including extrusions. For example, conventional extrusion chilling systems employ a "cooling" chamber downstream from the extruder. The extrusion is fed through the cooling chamber, wherein the extrusion can be sprayed with water, or partially/fully submerged in water in order to chill the extrusion. Various other components may also be included in such systems, such as a vacuum sizing chamber intermediate to the extruder and the cooling chamber. The vacuum sizing chamber can be used for both solid and hollow extrusions and employs an external vacuum pump to create a vacuum to assist the extrusion in maintaining its shape while it cools. Water can also be used in the vacuum chamber to cool the extrusion while the vacuum supports the shape.

However, cooling water systems have several drawbacks. Many products are adversely affected if contacted with water. Thus extra care must be taken to avoid such occurrences. Extrusion speeds are limited because the cooling water generally has a well defined heat transfer capability and thus can only cool the fresh extrudate accordance therewith. In practice, optimum cooling temperature of approximately 50° F. is achievable from a cost-effective standpoint, which limits the manufacturers ability to cool extrusions quickly. Additionally, cooling water systems require excessive floor space and also require treatments or special additive packages to prepare and maintain proper water chemistry, as well as to prevent scaling and bacterial growth, which add significantly to the cost thereof.

Coolant mediums other than water which have been used in cooling processes can be referred to collectively as refrigerants, including cryogens. Cryogens include liquid nitrogen, liquid carbon dioxide, liquid air and other refrigerants having normal boiling points substantially below minus 50° F. (−46° C.) Prior art methods of cooling articles using cryogens disclose the benefits of hilly vaporizing a cryogen into a gaseous refrigerant prior to contact with the articles to be cooled. Cryogens due to their extremely low boiling point, naturally and virtually instantaneously expand into gaseous form when dispersed into the air. This results in a radical consumption of heat. The ambient temperature can be reduced to hundreds of degrees below zero (Fahrenheit) in a relatively short time, and much quicker than may be realized with a conventional cooling water system. The extreme difference in vaporized cryogen and the extruded product allows the manufacturer to quickly cool an extrudate.

However, prior methods of cryogenic cooling fail to realize the advantages, both in increased efficiency and in improved system control, that can be achieved by utilizing forced gas convection in combination with cryogenic refrigerants, such as nitrogen and air. Some disadvantages of prior art cryogenic cooling systems include lower efficiency and limited options for controlling the cooling process. Such systems generally rely exclusively on the cooling effect of the refrigerant, to lower the ambient temperature and chill the article. Although prior art methods utilize forced convection to ensure complete vaporization of the cryogen, no methods use forced gas convection to control the rate of cooling of the article by controlling the wind chill temperature. Consequently, the only control variable in the prior art methods to adjust (lower) the temperature is the introduction of a liquid cryogen into the system. In contrast, utilization of forced gas convection adds a wide range of variable control to adjust the effective temperature, up or down, by controlling the velocity at which the refrigerant is circulated over/around the article to be cooled. Such a forced gas convection system is disclosed by Thomas et al. in U.S. Pat. No. 6,363,730, U.S. Pat. No. 6,389,828, and U.S. Patent Application Publication No. 2004/0216470 (now abandoned) incorporated herein in their entirety by reference thereto.

The basis of forced gas convection is the principle that increasing velocity of a refrigerant over a heated surface, such as by blowing, greatly enhances the transfer of heat from that surface. In the context of cold temperatures, this principle is probably better known indirectly from the commonly used phrase "wind chill" temperature. In that context, wind chill temperature is the apparent temperature to human flesh, taking into account the ambient temperature and the prevailing velocity of the wind. The stronger (higher velocity) the wind, the lower the temperature "feels," compared to if there were no wind present. Forced gas convection cooling systems, as disclosed herein, take advantage of this "wind chill" affect in their ability to remove heat from an object faster with a constant temperature of a gas.

In other words, if a 400° F. object is placed in a constant 75° F. atmosphere without velocity of the surrounding atmosphere, the transfer of energy from the object to the surrounding atmosphere by convection is much slower than if the atmosphere has a velocity over/around the object. An increase in velocity will increase the rate of energy transfer, even though the temperature of the atmosphere is constant. The rate of cooling can be increased or decreased by manipulating the velocity of the cooling medium as the temperature of the medium remains constant. This principle is advantageously utilized to significantly enhance the cooling efficiency of the system by creating, and controlling, "wind chili" temperature during the cooling process. As a result, the efficiency of the process is increased while simultaneously reducing the size, which is typically the length, of the cooling system.

However, the previous method disclosed by Thomas utilizes only a measurement of the ambient temperature within the cooling chamber to adjust the velocity and discharge of cryogen. An extrudate leaving a cooling chamber does not necessarily need to be cooled to an even temperature throughout, but may rely on "equilibrium cooling." This principle is advantageously utilized according to the invention to significantly enhance the cooling efficiency of the system by creating and controlling the "wind chill" temperature during the cooling process in relation to a measurement of the temperature of the product after leaving the cooling chamber. The basis for "equilibrium cooling" is that a mass having two different temperature zones, or a temperature gradient, will exchange energy between the two zones until an "equilibrium" temperature is reached. Thus, a manufacturer can reduce cooling time and cooling system length by supercooling at least the surface of the extrudate mass to form a "skin" having sufficient rigidity such that the extrudate may be handled as needed and then allowing the "equilibrium cooling" effect to take place after the extrudate has left the cooling system.

Another type of prior art cooling system utilizes a device called a "calibrator," and typically multiple such calibrators, to cool extrusions. A calibrator is a tool which generally has a central opening through which the extrusion is fed, the central opening having a surface which is generally in contact with the surface of the extrusion as it is fed through. As a result of contact with the surface of the extrusion, the calibrator acts as a heat sink and the heat is conducted to the calibrator and away from the extrusion thus cool the extrusion. Since cooling of the extrudate tends to make the material contract or change shape, a vacuum generated by external vacuum pumps is generally drawn through grooves in the calibrator inner surface making contact with the extrudate. This vacuum assists in maintaining the shape of the extrudate.

To enhance the heat transfer from the extrusion, internal passages or circuits are provided in the calibrator through which a coolant is circulated. Typically, the coolant is water, but liquid nitrogen is also known to have been used to some degree. However, circulating liquid nitrogen through the cooling circuits has met with some difficulties regarding contact of the liquid nitrogen with the calibrators. Additionally, cooling water systems include the inherent problems associated therewith as discussed above. The aforementioned U.S. Pat. No. 6,389,828 to Thomas discloses that it is preferable to first vaporize a liquid cryogen, such as liquid nitrogen, and then to circulate the super-cold vaporize refrigerant through the cooling circuits instead of the liquid cryogen, which thus requires a system for vaporizing the liquid cryogen prior to circulation through the cooling circuits of the calibrator.

Although such a method is an improvement over the prior art, the system my still require the use of external vacuum pumps as previously stated. The present invention provides for a calibration tooling chamber utilizing forced-gas convection of a cryogenic refrigerant in combination with a calibrator tooling or sizing template having a plurality of fins in an outer surface thereof to allow the extrudate to be cooled at an effective rate. This eliminates the need for internal passages, and thus the additional manufacturing costs associated with the required set-up/connection/break-down of the equipment between different product runs. Further, the present disclosure, by use of a forced gas convection cooling chamber, provides a means of generating an internally induced vacuum to assist the extrudate without the requirement of a separate external pump. External vacuum pumps are expensive, require continued maintenance and repair, are noisy and they must be replaced often.

Many extruded articles include at least one hollow, such as pipe, hose, etc., or may contain several hollow portions. Some cooling systems provide the manufacturer with only the ability to cool extrudate from an outer surface thereof by contact with a cooler medium (liquid, gas or solid depending on the system). Depending on the product geometry, however, a significant amount of an extrudate's mass may be positioned inward of the outer surface and between several hollow portions. Thus, it is difficult to quickly and effectively cool such an extrudate quickly because the cooling medium does not make contact with those portions.

Another problem encountered with cryogenic cooling systems, especially those that are separated-air gasses such as nitrogen, is the loss of cryogenic coolant. Cryogenic cooling systems are usually pressurized and cryogen is lost through system leaks or through cryogen being expelled into the hollow of an extruded article and exhausted to atmosphere. Such loss of cryogen must be replaced within the system and can be expensive.

Accordingly, there is a need for a method and apparatus for cooling articles which can provide improved efficiency, reduce the size of the cooling system.

SUMMARY

The present disclosure is for an apparatus and method for a cryogenic cooling system for removing thermal energy from an extruded article known as an extrudate. The cryogenic cooling system includes a calibration table having one or more calibrators. Each calibrator having body and an internal cooling conduit allowing for the flow of a coolant through the calibrator. The calibrator removes thermal energy from the extrudate through conduction and also provides mechanical support for the outer surface of the extrudate after the extrudate leaves the extruder die. Each calibrator is also connected to a refrigeration unit for removing thermal energy from the circulating coolant.

The cryogenic cooling system of the present disclosure also includes a high velocity gas chiller. The high velocity gas chiller circulates a coolant within a chamber removing thermal energy from the extrudate by convection. The high velocity gas chiller controls the velocity of the coolant across the extrudate to optimize cooling efficiency.

The cryogenic cooling system of the present disclosure may also include inner profile cooling for extruded articles formed having a hollow or void. The inner profile cool may be performed by introducing coolant into the hollow or void of the extrudate to remove thermal energy from an inner surface. Directly introducing coolant into an extrudate inner void removes heat by convection. Nozzles and/or an inner profile coolant plenum may be used to direct the flow of coolant along the inner profile. Inner profile cooling may also be performed by an inner profile conduction cooler having a plurality of heat transfer surfaces configured to contact the inner surface of a hollow extrudate.

Another aspect of the present disclosure includes a cascade refrigeration system using multiple refrigeration systems arranged in series to maximize heat removal from the coolant circulated throughout the components of the cryogenic cooling system.

Yet another aspect of the present disclosure is a cryogenic gas chiller. The cryogenic gas chiller utilizes a liquid cryogen as a heat transfer medium for cooling a gaseous coolant circulated through the cryogenic cooling system.

The system of the present disclosure allows the working coolant to be circulated in one or more closed loops, thus minimizing coolant loss.

BRIEF DESCRIPTION OF THE DRAWINGS

The present disclosure will be described hereafter with reference to the attached drawings which are given as non-limiting examples only, in which:

FIG. 9 is a perspective view of an inner profile convection cooler;

FIG. 10 is a section view of the inner profile convection cooler of FIG. 9;

FIG. 11 is a perspective view of an inner profile convection cooler including an inner profile coolant plenum;

FIG. 12 is a plan view of the inner profile coolant plenum of FIG. 11;

FIG. 13 is a perspective view of an inner profile conduction cooler of the present disclosure; and FIG. 14 is an exploded perspective view of the inner profile conduction cooler of FIG. 13.

DETAILED DESCRIPTION

While the present invention will be described fully hereinafter with reference to the accompanying drawings, in which a particular embodiment is shown, it is to be understood at the outset that persons skilled in the art may modify the invention herein described while still achieving the desired result of this invention. Accordingly, the description that follows is to be understood as abroad informative disclosure directed to persons skilled in the appropriate art and not as limitations of the present invention.

Figure 1:
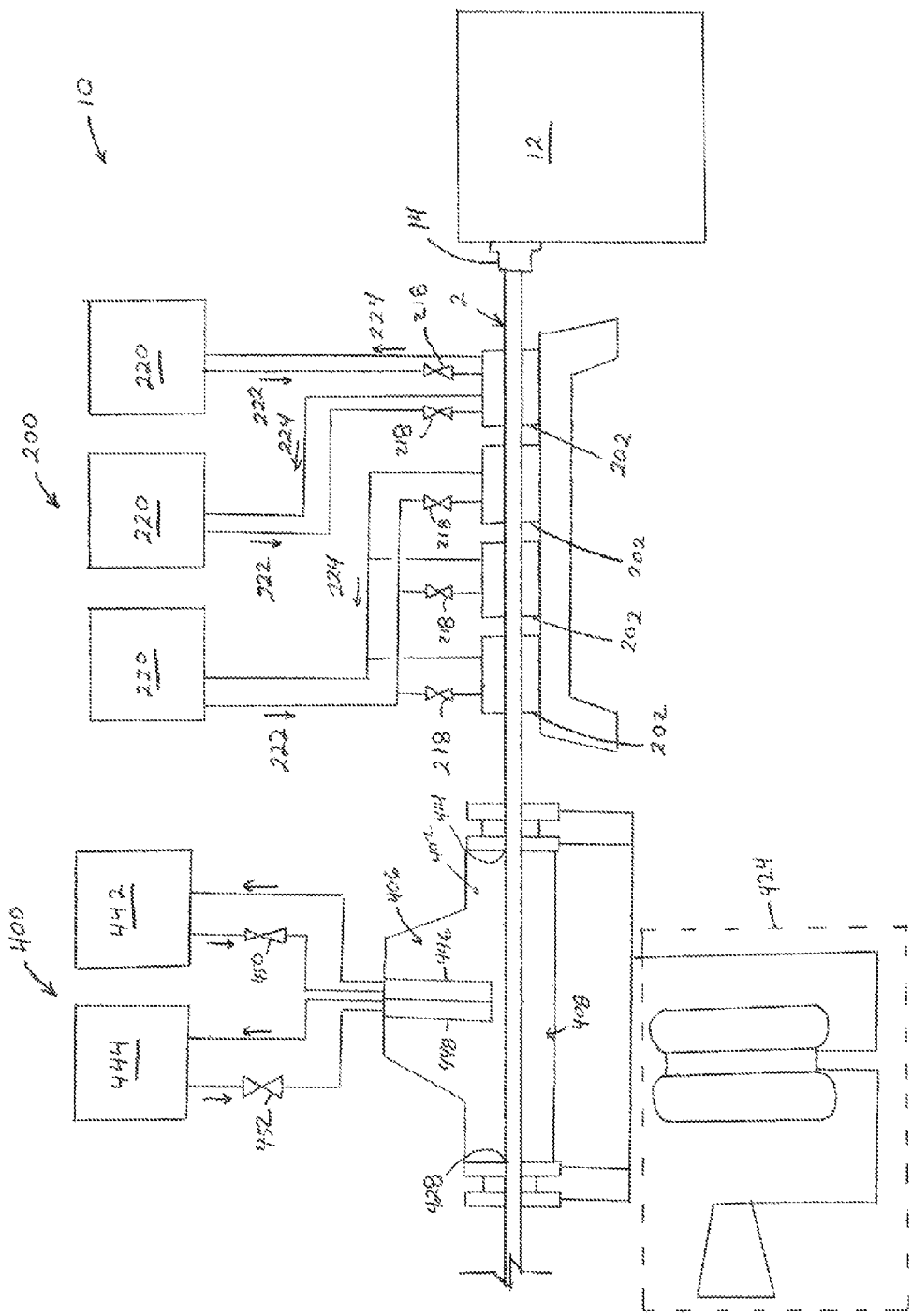
FIG. 1 is a schematic representation of an embodiment of the cryogenic extrudate cooling system of the present disclosure, including an calibration table and a high velocity convection chiller.

The present disclosure relates to a cryogenic extrudate cooling system 10 and method. Referring to FIG. 1, material, for example plastic resin, is heated above its melting temperature and forced by an extruder 12 through a die 14 to form a predetermined shape. The extruded material 2, or extrudate, having an outer surface 2a and possibly an inner surface 2b defining avoid 2c, must be cooled to a temperature below its melting point to gain rigidity and to maintain the desired shape. A calibration table 200, including one or more calibration tools, or simply "calibrators" 202, are provided to exchange heat by conduction away from the extrudate 2. After being cooled initially by the calibration tools 202, the extrudate is fed through a cooling chamber wherein dried air convectively cools the extrudate. The present disclosure may also include inner profile cooling for extrudate having a shape that includes an inner cavity or void. The inner profile cooling of the present disclosure includes an inner profile coolant spray system introducing cooled cryogen into the cavity to conduct heat away from the inner surface of the extrudate by convection. The inner profile cooler may also include an inner profile conductive cooler in contact with the inner surface 2b of extrudate 2.

Figure 2:
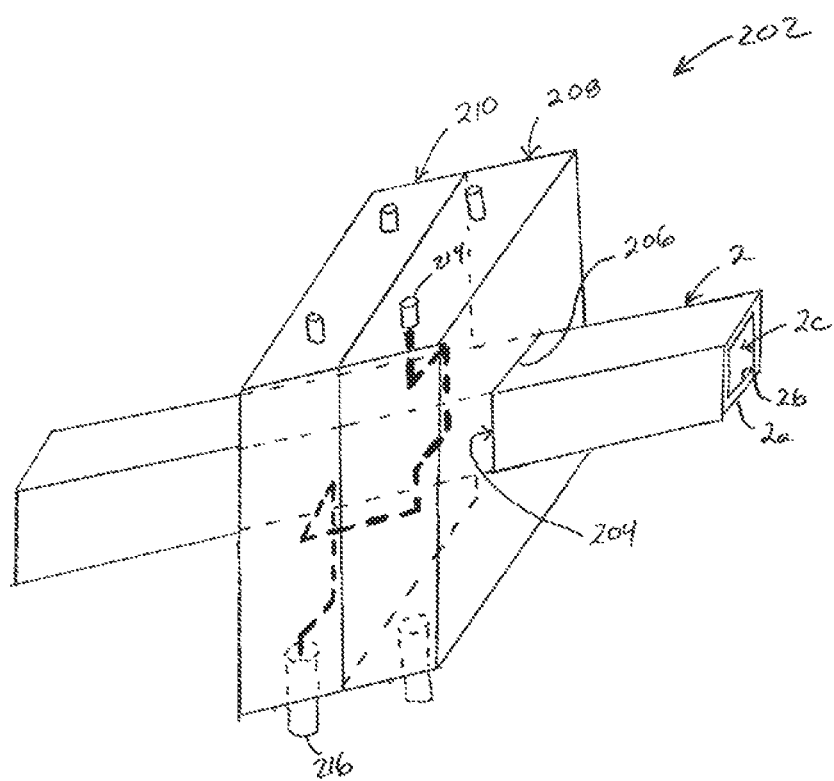
FIG. 2 is a representative perspective view of a calibrator for conductively cooling an outer surface of an extrudate.

Referring to FIG. 2, a calibrator 202 includes a passage 204 defining an inner surface 206 that makes contact with, but also provides for the passage of an extrudate 2. By making contact with the extrudate 2, the calibrator 202 acts as a heat sink and removes energy from the extrudate 2 through conduction. The calibrator 202 also assists the extrudate in maintaining its extruded shape.

Each calibrator 202 includes a first section 208 and a second section 210. Each calibrator 202 may also include an internal cooling conduit 212 having an inlet 214 and an outlet 216. Cooling conduit 212 is configured to allow the flow of cryogen through each of the first and second sections 208, 210 of calibrator 202. While one cooling conduit is shown in the exemplary embodiment for clarity, it should be apparent that multiple conduits may be employed depending on the cooling requirements of a particular application. Also, calibrator may have additional sections. Further, internal cooling conduit may be configured entirely within a single calibrator section, or across two or more sections.

The calibrator may have an outer surface including a plurality of fins extending outwardly therefrom and running substantially parallel to the center axis of the passage 220. The plurality of fins define a plurality of channels there between. Inclusion of the plurality of fins 234 greatly increases the outer surface area of the calibrator 202. By increasing the outer surface area of the calibrator 202, greater amounts of energy can be dissipated to the vaporized cryogen circulated in the cooling system. The plurality of fins also increase the mass of the calibrator 202 which increases the amount of energy (heat) the calibrator can remove from the extrudate. Vacuum grooves may also be provided in the inner surface 206, preferably spaced apart and extending the entire circumference of the product passage 204. At least one pinhole (not shown) may be provided from within each vacuum groove and extending to the outer surface, such that the pressure realized outside of the calibrator 202 is also communicated to the vacuum groove. Preferably, a pinhole is provided at such that a single vacuum groove includes a plurality of pinholes communication with the atmosphere outside the calibrator 202.

Figure 3:
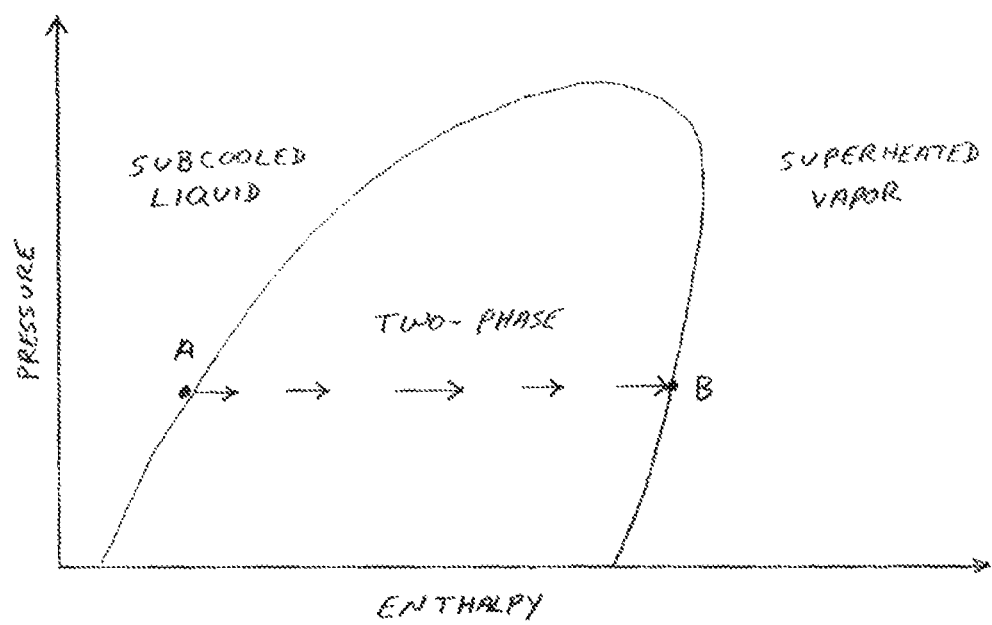
FIG. 3 is a representation of coolant properties as the coolant flows through the calibrator depicted in FIG. 2.

Referring again to FIG. 1, a throttling expansion valve 218 is configured to admit cryogen coolant into the cooling conduit 212 at a temperature and pressure such that the cryogen is near its saturation point but yet completely in the liquid phase. The cryogen coolant enters the cooling conduit 212 at a point represented by A on FIG. 3. As the cryogen flows through the conduits in the calibrator, the heat removed from the extrudate is transferred to the cryogen resulting in a mixed-phase cryogen. The cryogen exits the cooling conduit 212 at outlet 216 as a gas represented by B on FIG. 3. By using a cryogen coolant that undergoes a phase change, the system of the present disclosure takes advantage of the latent heat of vaporization of the cryogen coolant to increase the heat transfer efficiency of thermal energy from the extrudate 2.

Throttling expansion valve 218 may be controlled by any suitable controller known in the art, such as a microprocessor, programmable logic controller and other such systems.

Cooling conduit 212 forms part of a cooling circuit that further includes refrigeration unit 220 as shown in FIG. 1. Refrigeration unit 220 may be of the vapor-compression type commonly known in the art, using commercially available refrigerants such as R404A. Refrigeration unit may also be of the cryogenic gas chiller type described below.

Refrigeration unit 220 removes the heat absorbed by the cryogen coolant from extrudate 2, allowing the cryogen coolant to be circulated in a closed loop circuit as generally indicated by arrows 222, 224. The exemplary embodiment shown in FIG. 1 utilizes a number of refrigeration units for calibrator 202 cooling circuits. The number of refrigeration units may be varied depending on the thermal load, the number of calibrators, the desired control characteristics, etc. For example, a given calibrator 202 may be associated with a single refrigeration unit 220. Alternatively, a calibrator 202 may have more than one refrigeration unit 220 if the thermal loading requires. Also, a single refrigeration unit may support more than one calibrator 202 for lower thermal loads.

Referring to FIG. 1, after passing through one or more calibrators 202 the extrudate 2 may also pass into a high velocity extrusion chiller 400. The high velocity convection chiller 400 circulates a cryogenic gas about the outer surface of the extrudate to remove additional heat from the extrudate.

Figure 4:
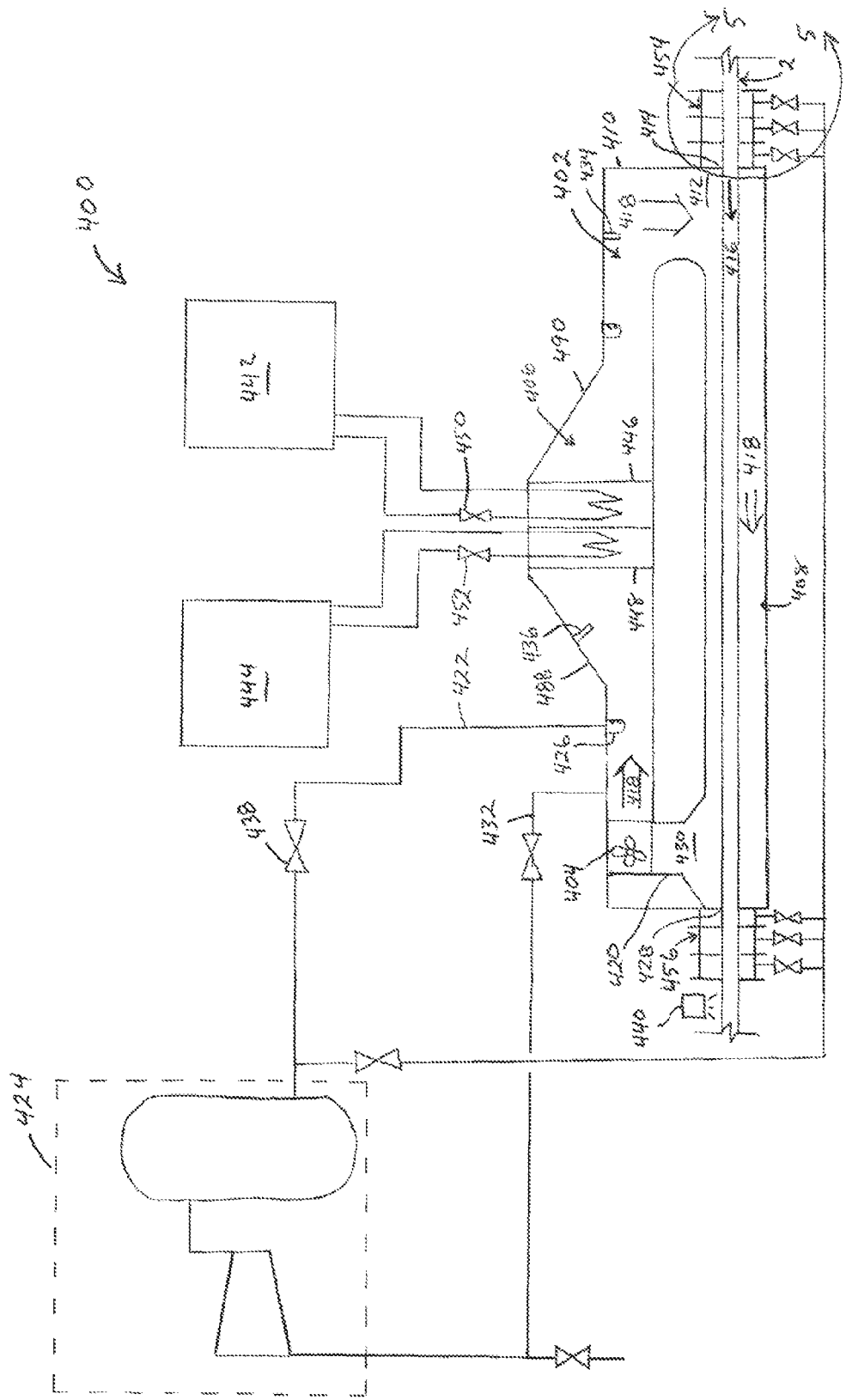
FIG. 4 is a schematic representation of a high velocity convection chiller.

A schematic representation of a high velocity convection chiller 400 is shown in FIG. 4, depicting the internal duct work of the chiller 400 including a chamber 402. The framework and insulation materials have been removed for ease of discussion. Forced gas convection cooling systems are described in U.S. Pat. No. 6,389,828, which is incorporated herein in its entirety. The chiller 400 10 includes a variable speed fan 404 or other suitable means for circulating a gas. The chiller 400 includes a back chamber 406, referred to as a chamber, and a front chamber 408, known as the cooling chamber, connected by end duct 410. The end duct 410 includes an extrudate inlet throat, 412 including an extrudate inlet passage 414, or other opening, through which an extrudate 2 may enter the chiller 400, preferably traveling in a direction shown by arrow 416.

In operation, the fan 404 preferably circulates the gas contained in the system in a direction shown by arrows 418, although circulation may be in the reverse direction if desired. Gas is drawn through fan 404 from return chamber 420, from the front chamber 405 through return throat 430 and discharged from the fan 404 into the back chamber 406. The gas enters the front chamber 408 from the end duct 410 inlet throat 412, such that the gas travels through the front chamber 408 in the same direction as the extrudate 2. This process can be repeated as the gas is continuously circulated through the chamber 402 in a closed loop to cool an extrudate. A convection coolant feed line 422 is in communication with a convection coolant source 424 and is adapted to deliver convection coolant, such as nitrogen or air chiller 400. Preferably, the feed line 422 extends into the back chamber 406 and includes a spray bar 426 having a plurality of orifices to evenly inject and distribute liquid cryogen. Preferably, the feed line 422 is placed in communication with the back chamber 406 downstream from the fan 404 to inject or distribute convection coolant into the stream of circulated gas.

The fan 404 can be controlled by a controller (not shown) to circulate the vaporized cryogen at a variable velocity through the back chamber 406, end duct 410, and front chamber 408 where it cools the extrudate 2. The cooling process continues, including the injection of additional liquid cryogen into the back chamber 406 as needed to obtain, or maintain, a desired temperature in the front chamber 408.

In one embodiment of the present disclosure, the convection coolant may be liquid nitrogen, however, other cryogens such as liquid carbon dioxide, liquid air and other refrigerants having normal boiling points substantially below minus 50° F. (−46° C.) can also be used. The liquid nitrogen expands 700 times its volume in liquid state, capturing a high BTU as it transitions to gaseous form, creating a highly effective refrigerant and rapidly reducing the temperature in the convection chiller 400.

In another embodiment of the present disclosure, the convection coolant may be dried, super-cooled atmospheric air. Compressed, low-dewpoint air can provide an economical alternative to separated liquid and/or gaseous cryogens. The cooling system and method of the present disclosure may employ a cascade refrigeration system, as described below, to cool compressed and dried atmospheric air for use as a convection coolant.

The extrudate 2 enters the chiller 400 through the extrudate inlet passage 414 and travels through the front chamber 408 where it is cooled by the circulating convection coolant. An extrudate outlet passage 428, or other opening, is provided at an end of the front chamber 408 opposite the extrudate inlet passage 414 that allows the extrudate to exit die chiller 400.

Preferably, both the extrudate inlet passage 414 and outlet passage 428 are equipped with seals to prevent and/or reduce the ingress of ambient air and egress of convection coolant to and from the system. Optionally, the seals can be selected or designed to permit excess pressure in the system to vent outside. In such a case, a separate vent may not be needed.

The chiller 400 can further include a number of other components for controlling, optimizing, and generally automating the cooling process. These other components can include a vent 432, an internal temperature sensor 434, and a heating unit 436. A controller (not shown) can include a microprocessor, programmable logic controller, etc., for controlling the operation of the cooling system 10 and its various subparts, either automatically or under the control of an operator.

A vent 432 can be provided, for example in the back chamber 406 as shown, to release pressure build up which may be created by the pressure increase resulting from heat transfer from the extrudate 2 to the convection coolant. The vent can simply be a small orifice and is preferably placed upstream of the coolant feed line 422 and spray bar 426 and downstream of the front chamber 408 (with respect to gas flow as shown by arrows 418) to minimize the loss of cooling capacity. By venting after the coolant has been circulated over the hot extrudate 2 and before the spray bar 426 distributes fresh convection coolant, the vented coolant has removed energy from the product and is the warmest portion of coolant in the system and therefore does not waste newly delivered coolant.

Temperature sensor 434 can be provided in communication with the convection coolant stream generally at any point, but is preferably in the front chamber 408, back chamber 406, or end duct 410, as shown, to monitor temperature of the coolant at a desired point. Alternatively, additional temperature sensors could be positioned at different locations to detect the temperature of the gas at several points in the chiller 400. Output from the temperature sensor 434, and other sensors, if more are used, can be provided to the controller for use in regulating the speed of the fan 404 and controlling a valve 438 provided in the coolant line 422 to introduce coolant into the back chamber 406.

The temperature sensor 434 can be, for example, a thermocouple. The controller can be programmed with the wind chili equation and can also receive a signal from the fan 404 indicative of the fan's speed. This data can be used to determine the effective temperature in the front chamber 408. The heating unit 436, can be a simple heating element and can be located, for example, in the back chamber 406, as shown in the figure. The heating element can be operated by the controller to increase the temperature in the chamber 402, if necessary, to adjust and maintain the desired ambient temperature. Multiple such cooling systems may be placed in series and operated independently or together.

In a preferred embodiment of the present invention, an external temperature sensor 440, such as an infrared temperature sensor, is provided at a desired point downstream from the extrudate outlet passage 428 to sense the temperature of the extrudate 2 after exiting the front chamber 408. For example, the external temperature sensor 440 could be placed adjacent the extrudate outlet passage 428 or may be placed further downstream, such as adjacent a cutting assembly or puller. The external temperature sensor 440 senses the surface temperature of the extrudate 2 and relays the output to the controller. The controller utilizes the output from external temperature sensor 440 in addition to temperature sensor 434 (and additional temperatures if provided) in regulating the speed of the fan 404 and controlling the valve 438 provided in the coolant feed line 422 to introduce coolant into the back chamber 406.

The cooling efficiency of the system can generally be optimized by using principles of forced air convection. Extraction of heat from an extrudate 2 can be increased by blowing coolant over a warm surface. The effective temperature inside the front chamber 408, or cooling chamber can be calculated from the ambient temperature and the velocity that the coolant is blown over the surface of the extrudate 2 using the following equation for calculating wind chill temperature:

$$T_{wc} = 0.0817(3.71V^{0.5} + 5.81 - 0.25V)(T - 91.4) + 91.4$$

More specifically, the efficiency of the chiller 400 can be optimized, i.e., maximum cooling using a minimum amount of coolant by controlling the speed of the fan 404. In particular, for a given amount of coolant introduced into the back chamber 406 or feed chamber, the speed of the fan 404 can be increased in order to increase the rate in cooling of the front chamber 408 without adding additional coolant. Only when the speed of the fan 404 is at its maximum, would it be necessary to inject additional coolant into the back chamber 406 to further reduce the temperature in the front chamber 408. Moreover, the temperature in the front chamber 408 can also be regulated to a set point temperature by adjusting the speed of the fan 404, faster or slower, instead of injecting more coolant. Output from the external temperature sensor allows the controller to manipulate the wind chill within the front chamber 406 to increase or decrease the cooling of the extrudate 2. In this sense, the chiller 400 can be optimized based on the optimum product temperature. Thus, minimum necessary coating using a minimum amount of coolant is achieved.

Convection chiller 400 may also include one or more refrigeration systems 442, 444, to provide additional cooling of the coolant circulating in chamber 402. Refrigeration systems 442 and 444 may be connected to heat exchangers 446, 448, respectively. As the convection coolant is blown by fan 404 through the back chamber 406, heat is removed from the coolant as the coolant passes over heat exchanges 446, 448, allowing the coolant to be recycled in a closed loop system.

Refrigeration units 442 and 444 may be of the mechanical vapor-compression type, or may be of the cryogenic gas chiller type described below. In one embodiment of the present disclosure, refrigeration units 442, 444 may utilize a vapor-compression refrigeration cycle wherein a refrigerant, such as R404A, may be circulated through a thermal expansion valve 450, 452.

High velocity extrusion chiller 400 may also include seals 454, 456 positioned to prevent and/or reduce ingress of ambient air into chamber 402 through inlet passage 414 and outlet passage 428. Because of the operating temperatures of the chiller 400, ingress of ambient air can result in frost build up on heat exchangers 446, 448 which acts to reduce the efficiency of heat transfer and also can impede air flow.

Figure 6:
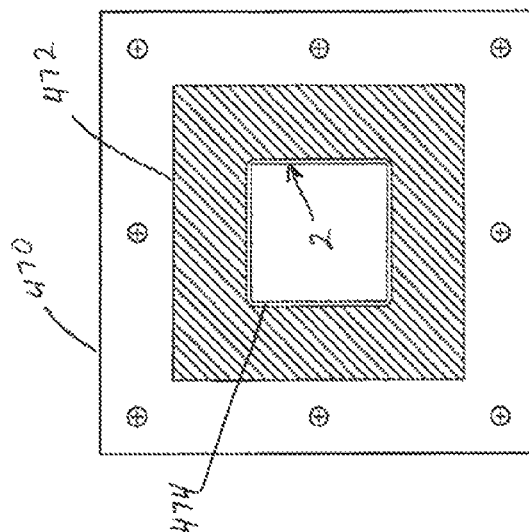
FIG. 6 is an end view showing a seal frame and seal skirt for the seal of FIG. 5.
Figure 5:
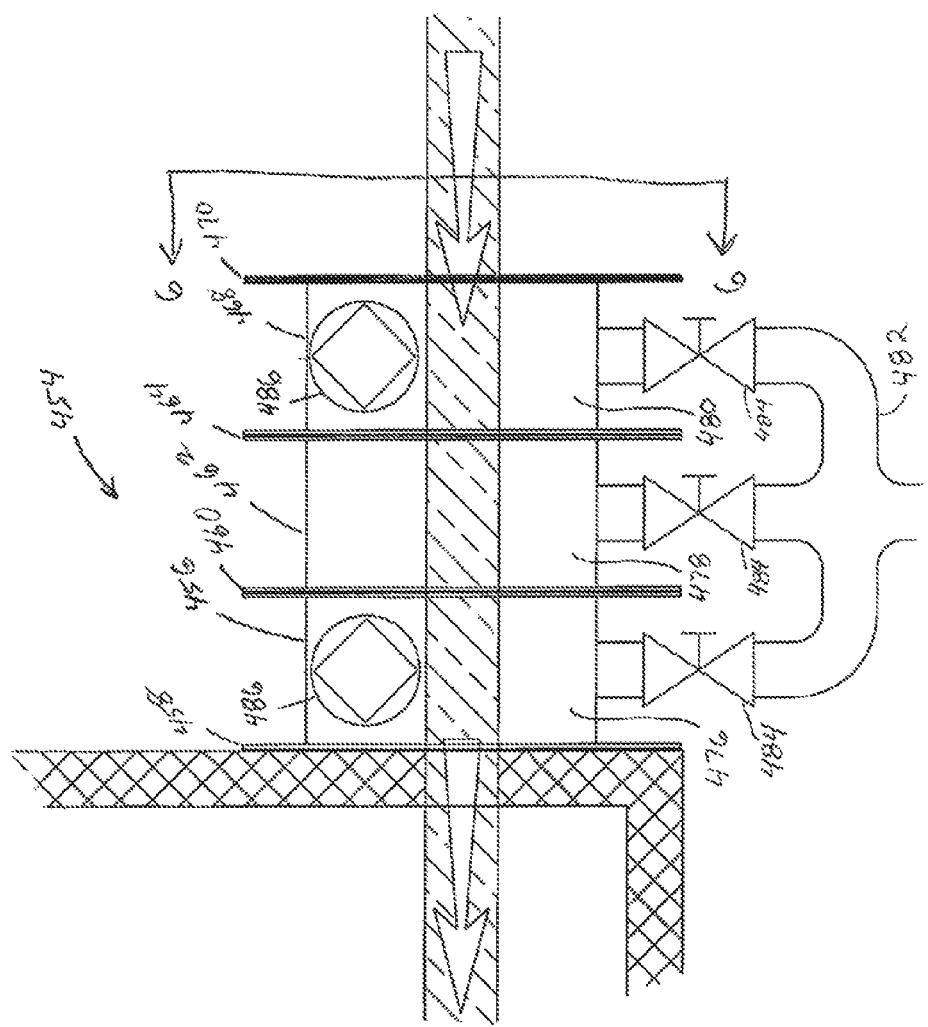
FIG. 5 shows a detailed view of an inlet or outlet seal for the high velocity convection chiller of FIG. 4.

Seals 454 and 456 are essentially the same configuration, and a detailed view of seal 454 is shown in FIG. 5 and is discussed as an exemplary embodiment. Seal 454 includes a seal housing 456 disposed between seal frames 458, 460. In the exemplary embodiment, seal 454 also includes additional seal housings 462 and 468 and additional seal frames 464 and 470. Seal frames 458, 460, 464, and 470 support a seal skirt 472, as shown in FIG. 6. Seal skirt 472 is formed from a resilient material such as neoprene 5rubber, polyethylene, or other suitable material. Seal skirt 472 is formed to include an aperture 474 matching the exterior shape of extrudate 2.

In the exemplary embodiment of FIG. 5, seal frames 458, 460, 464, and 470, and seal housings 456, 462, and 468, define a series of seal locks 476, 478, 480. Seal skirts 472 are in contact with the outer surface of extrudate 2 as it passes through seal 454, creating separate gas-tight zones prevent ingress of ambient air and egress of coolant.

Seals 454 and 456 may also include a coolant manifold 482 to introduce pressurized coolant into locks 476, 478, 480. Coolant manifold may also include control valves 484 and pressure sensors 486. Control valves 484 and pressure sensors 486 may be connected to a controller such as a microprocessor, programmable logic controller, or other device to maintain a predetermined pressure within each lock. Maintaining the seal pressure above the ambient pressure will thus prevent ingress of atmospheric air into chamber 402. Likewise, maintaining the seal pressure above the coolant pressure inside chamber 402 will prevent loss of coolant.

Referring again to FIG. 4, the back chamber 406 of the high velocity extrusion chiller 400 may also include a diffuser duct 488 and a convergence duct 490.

Diffuser duct 488 expands in cross sectional area of back chamber 406 thus reducing the velocity of the coolant flow as the coolant flows from fan 404 to heat exchangers 446 and 448. Slowing the velocity of the coolant across heat exchangers 446, 448, produces a more efficient heat transfer. After the coolant passes through heat exchangers 446 and 448, it is desirable to increase the velocity to take advantage of convective cooling to remove heat from extrudate 2. It is desirable that the velocity of the coolant across heat exchangers 446, 448 be approximately 100 to 1000 ft/min. After the coolant passes across heat exchangers 446 and 448 convergence duct 490 reduces the cross section of back chamber 406 and consequently increases the coolant velocity for introduction into front chamber 408.

Referring again to FIG. 1, coolant source 424 is in fluid communication with chamber 402 and may also provide pressurizing coolant to seals 454 and 456. In embodiments of the present disclosure, coolant may be any cryogen, such as nitrogen, carbon dioxide, or air. Commercially available cryogens in their pure form require them to be separated from air and transported to the end user. An embodiment of the present disclosure includes a cascade refrigeration system 600 as part of coolant source 424 that allows for compressed, dehumidified atmospheric air to be used as a coolant in the system of the present disclosure.

Figure 7:
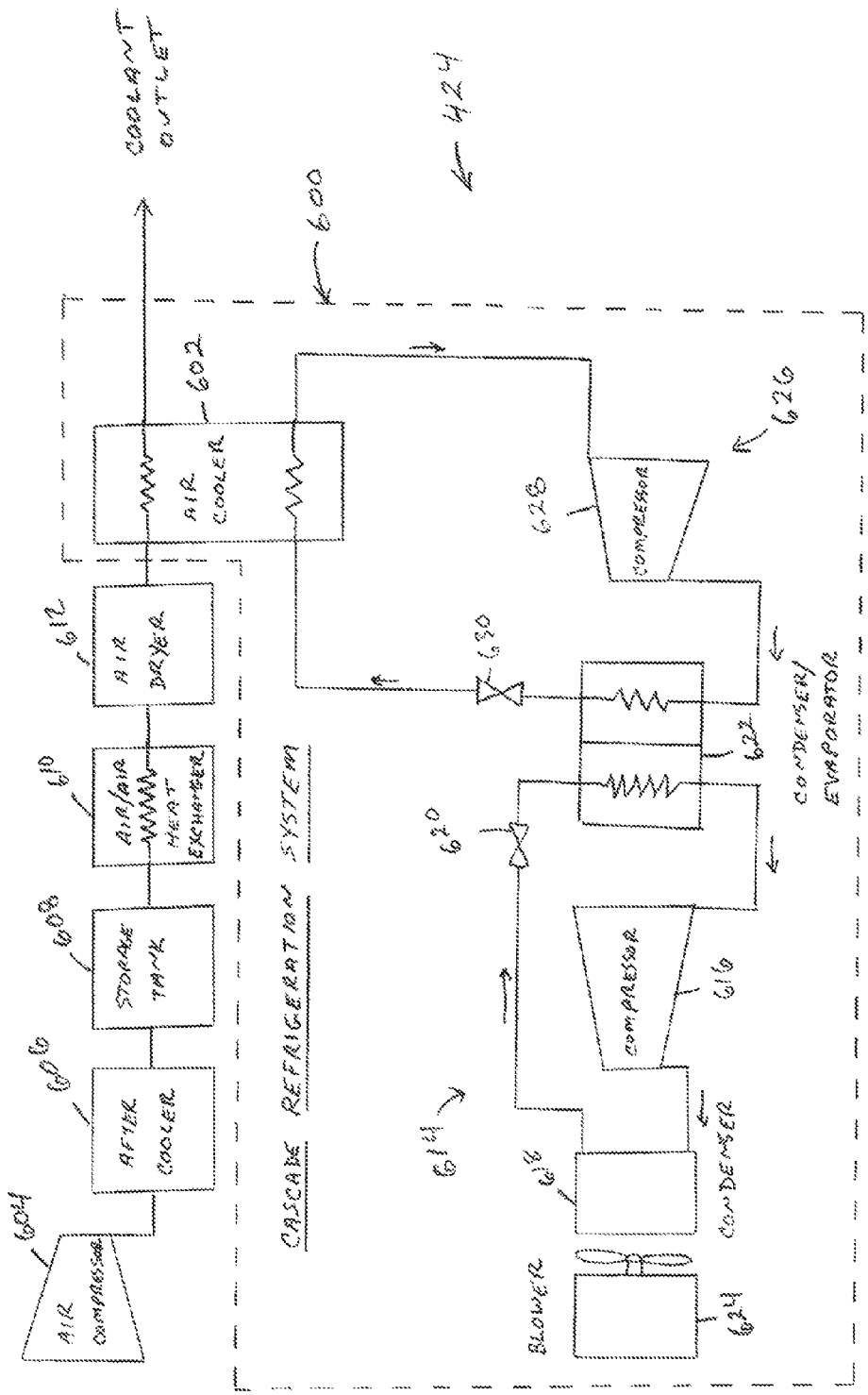
FIG. 7 is a schematic representation of a cascade refrigeration system that allows compressed and dried atmospheric air to be used as a coolant for the cryogenic extrudate cooling system of the present disclosure.

Cascade refrigeration system 600, as shown in FIG. 7 allows dried, compressed atmospheric air to be used as a coolant in the cryogenic cooling system 10 of the present disclosure. Cascade refrigeration system 600 includes an air cooler 602 for removing thermal energy from dried compressed air. Dried compressed air is provided by an air compressor 604. After being compressed the air may pass through an after cooler 606, a storage tank 608, an air/air heat exchanger 610, and an air dryer 612. After the air is dried, it is passed through air cooler 602 and cooled to a temperature between −50° F. and −150° F.

Cascade refrigeration system 600 uses a series of vapor-compression refrigeration systems. The exemplary embodiment uses a first refrigeration system 614 including a compressor 616, a condenser 618, a thermal expansion valve 620, and a heat exchanger 622 acting as an evaporator. A blower 624 is provided to remove heat from the working fluid of first refrigeration system 614 in condenser 618. A second refrigeration system 626 includes a compressor 628, heat exchanger 622 acting as a condenser, a thermal expansion valve 630, and air cooler 602. First refrigeration system 614 cools the working fluid of second refrigeration system 626, making possible removal of a large amount of heat from the air in air cooler 602.

Figure 8:
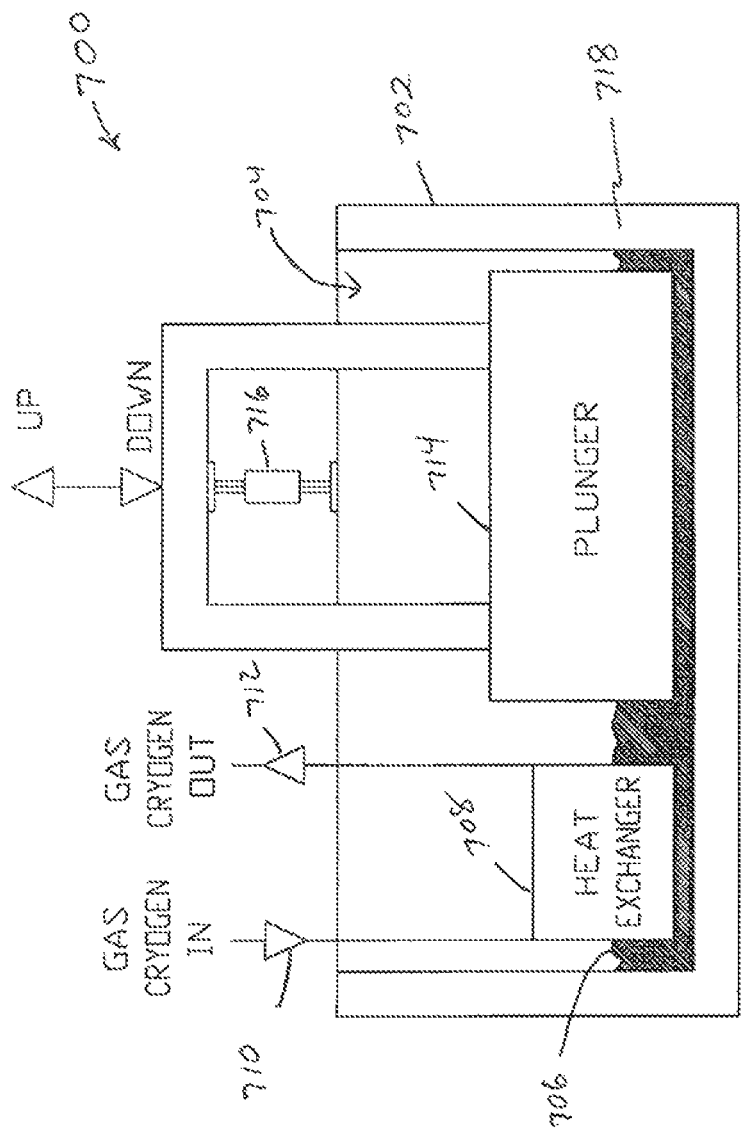
FIG. 8 is a representation of a cryogenic gas chiller that may be used to remove thermal energy from the coolant used in the cryogenic extrudate cooling system of the present disclosure.

An aspect of the present disclosure may also include a cryogenic gas chiller 700 for cooling a cryogenic fluid delivered to the extrudate cooling system 10 and may generally be used in place of mechanical vapor-compression chillers. Referring to FIG. 8 the cryogenic gas chiller includes a housing 702 defining a chamber. The chamber 704 is configured receive a liquid cryogen 706, such as liquid nitrogen. Within the chamber is a heat exchanger 708. In the exemplary embodiment, the heat exchanger 708 comprises an inlet manifold 710 and an outlet manifold 712. Heat exchange conduits are coiled between the inlet and outlet manifolds. In the exemplary embodiment, copper tubing is used as the inlet and outlet manifolds 710, 712 and the heat exchange conduits. As should be apparent, brass, aluminum, and an array of other thermally conductive materials and alloys are equally acceptable.

The heat exchanger coil 708 is positioned in the chamber such that it is partially submerged in the liquid cryogen. The cryogenic gas chiller also includes a plunger 714 within the chamber 702. The plunger 714 is coupled to a positioner 716 configured to move the plunger 714 up and down within the chamber 704. In exemplary embodiments, the positioner may be a hydraulic or pneumatic cylinder, servo motor, or other suitable mechanism. Cryogenic gas cooler 700 may also include insulation 718 for chamber 702 to reduce heat transfer from the ambient environment to the liquid cryogen within chamber 704.

Raising and towering the plunger 714 results in a displacement of the liquid cryogen 706 contained in the chamber 704. Consequently, lowering the plunger causes the level of liquid cryogen to rise, contacting a greater surface area of the heat exchanger. Alternatively, raising the plunger results in a drop in the level of liquid cryogen, wherein the liquid cryogen in contacts less of the surface area of the heat exchanger.

The rate of heat transfer by the heat exchanger 708 may be controlled by adjusting the level of the liquid cryogen 706. The greater the surface area of the heat exchanger in contact with the liquid cryogen, the greater the rate of heat transfer.

A cryogenic gas is introduced through the tube-side of the heat exchanger. The cryogenic gas may then be used for other cooling applications such as inner profile cooling, forced convection extrudate cooling, and other similar applications.

The cooling system 10 of the present disclosure may also include cryogenic inner profile cooling for removal of thermal energy from the inner surface 2b of extrudate 2 as shown in FIGS. 9-14. In one aspect of inner profile cooling of the present disclosure, a cryogenic gas is introduced directly into an internal cavity or void of the extrudate as illustrated in FIGS. 9-12. The cryogenic gas transfers heat by convection from the extrudate and is exhausted to atmosphere.

Inner profile cooling system 800 includes a coolant source delivered through coolant line 802, preferably a cryogen such as nitrogen, carbon dioxide, or air, the injection of which into an inner cavity or void of an extrudate 2 can be controlled by a feed valve (not shown) placed in coolant line 802, which itself can be operated by a controller such as a microprocessor, programmable logic controller, etc.

The coolant is communicated to an extruder die 14 via outlet conduit 804. Extruder die 14 is shown in more detail in FIGS. 9 and 10. Extruder die 14 includes an inlet bore 806 extending from an outer surface 18 of the extruder die 14 through a mandrel 16 that is adapted to form an extrudate hollow 2c within the extrudate 2. The inlet bore 806 is adapted to be placed in fluid communication with the outlet conduit 804 and thereby pass coolant through the extruder die 14 and mandrel 16 and into the extrudate hollow 2c. Inlet bore 806 and outlet conduit 804 may be separately coupled such that different dies can be interchanged for different product configurations. Coolant may enter the extrudate hollow 2c to transfer heat away from inner surface 2b of extrudate 2.

In another aspect of the present disclosure includes, an outlet extension 808 is provided to ensure that the pressure exerted by the vaporized cryogen as it is introduced into the extrudate hollow 2c is spaced from a leading edge 20 of the die 14. Outlet extension 808 may further include an inner profile coolant plenum 810, as illustrated in FIGS. 11 and 12. Coolant plenum 810 is in fluid communication with coolant source 802 and is configured to have the shape of the hollow 2c of extrudate 2. Coolant plenum includes a number of orifices 812 arranged to distribute coolant across inner surface 2h extrudate 2. In the exemplary embodiment, coolant plenum 810 is coupled to outlet extension 808. Preferably, coolant plenum is removable coupled to coolant source 802 to accommodate various shapes of extrudate 2.

The outlet extension 808 may also include a nozzle 814 or other means for directing the flow of coolant onto an inner surface 2b of the extrudate 2. Additionally, orifices 812 may also include nozzles to direct coolant flow from coolant plenum 810.

Referring to FIGS. 13 and 14, the cryogenic cooling system 10 of the present disclosure may also include an inner profile conduction cooler 900. The inner profile conduction cooler 900 includes heat transfer surfaces 902 having cooling conduits 904 through which coolant is circulated. In the exemplary embodiment shown in FIGS. 13 and 14, inner profile conduction cooler is configured for an extruded 4 inch by 4 inch hollow fence post. As should be apparent, inner profile conduction cooler 900 may be configured to cooperate with any inner profile shape of extrudate 2.

Inner profile conduction includes a coolant source, preferably a cryogen such as nitrogen, carbon dioxide, or air, delivered through the mandrel 16 of die 14. Coolant flow can be controlled by a feed valve (not shown) placed in coolant line, which itself can be operated by a controller such as a microprocessor, programmable logic controller, etc. Coolant inlets 906 located in mandrel 16 are connected to a coolant source. Coolant inlets 906 are in fluid communication with conduits 904 disposed within heat transfer surfaces 902. An actuator 908 may be attached to the face 20 of die 14. Heat transfer surfaces 902 are pivotally attached to support arms 910 at a lug 920. Support arms are also pivotally coupled to abuse 912, which is attached to the face 20 of die 14. Actuator 908 includes a positioner 914 having a number of faces 916, each configured to cooperate with corresponding surface 918 on each support arm 910.

Actuator 908 moves positioner 912 to adjust support arms 910 such that heat transfer surfaces 902 maintain contact with inner surface 2b of extrudate 2. As the extrudate 2 leaves die 14 and passes over heat transfer surfaces 902, thermal energy is removed from inner surface 2b causing the extrudate to "skin" resulting in rigidity to maintain the desired inner profile shape. Additionally, inner profile conduction cooler 900 also provides mechanical support for extrudate 2 immediately as extrudate 2 exits die 14. This additional mechanical support allows for greater control of the inner profile shape of the extrudate 2, resulting in a higher quality product.

Aspects of the present disclosure may be connected to any of various controllers, such as microprocessor based controllers, programmable logic controllers, data acquisition systems, etc. allowing for automated control of the entire extrudate cooling system 10 or the various parts thereof. As should be apparent to one skilled in the art, data, such as temperature, pressure, velocity, flow rate, and other parameters may be provided to the controller by any of the various sensors available in the art. The controller may include one or more algorithms for analyzing the input data to automatically adjust system parameters to optimize system operation.

Advantageously, the present invention allows extrudate with a hollow profile to be cooled from the outside and from within. The internal and external surfaces of the extrusion can be cooled at equal or variable rates, which allows for extensive process control heretofore unseen. The present invention, by providing cooling from within the extrusion, provides for quicker cooling and shorter cooling chamber lengths. Also, the internal coolant flow provides a positive pressure against the internal surfaces of the extrusion, which in turn reduces or eliminates the need for an external vacuum on the outer surface of the extrudate to provide a quality product. Since less external vacuum is required, the amount of drag between the product and tooling is reduced, which provides for increased rates of production and smaller downstream, equipment such as pullers.

Various features of the invention have been particularly shown and described in connection with the illustrated embodiments of the invention, however, it most be understood that these particular embodiments merely illustrate and that the invention is to be given its fullest interpretation within the terms of the appended claims.

The invention claimed is:

1. An apparatus for cooling an article extruded through a die and formed to include a void, the void defining an inner profile of the extruded article, the apparatus comprising:
   a coolant source;
   a conductive heat exchanger configured to transfer thermal energy from an outer surface of the extruded article, the conductive heat exchanger being in fluid communication with the coolant source;
   the conductive heat exchanger further including a body and a coolant conduit disposed within the body, the coolant conduit configured to receive a coolant from the coolant source and provide coolant flow throughout the conductive heat exchanger;
   a convective heat exchanger configured to transfer thermal energy from an outer surface of the extruded article, the convective heat exchanger comprising a housing defining a chamber, the chamber including a back chamber and a front chamber;
   the front chamber including an extrudate inlet passage and an extrudate outlet passage, wherein an extrudate enters the front chamber after passing through the conductive heat exchanger;
   the convective heat exchanger including a refrigeration unit in communication with an evaporator disposed within the back chamber, the evaporator configured for removal of thermal energy from a circulating coolant within the convective heat exchanger;
   the convective heat exchanger further including a fan configured to impart a velocity to the circulating coolant;
   the back chamber further including a diffuser located adjacent and up stream of the evaporator, and a convergence duct adjacent and down stream of the evaporator, wherein the diffuser reduces coolant velocity imparted by the fan across the evaporator and the convergence duct increases coolant velocity before the coolant enters the front chamber;
   a coolant plenum configured to cooperate with the inner profile of the extruded article, the coolant plenum in fluid communication with the coolant source and the void of the extruded article, wherein the coolant is introduced through the coolant plenum into the void to provide for removal of thermal energy from an inner surface of the extruded article by convection; and
   an inner profile conductive heat exchanger coupled to the die and configured to transfer thermal energy from the inner surface of the extruded article, the inner profile conductive heat exchanger including a base attached to the die, a plurality of support arms pivotally coupled to the base, a plurality of heat transfer surfaces pivotally coupled to the support arms, and an actuator configured to position the heat transfer surfaces such that heat transfer surfaces are in contact with the inner surface of the extruded article.

2. The apparatus of claim 1 further comprising a seal at each of the extrudate inlet passage and the extrudate outlet passage, the seal comprising:
   a seal housing; and
   a seal frame, the seal frame supporting a seal skirt, the seal skirt including an aperture configured to match the exterior shape of the extruded article.

3. The apparatus of claim 2 wherein a seal lock is defined by the seal housing and the seal frame, and wherein the seal lock is pressurized to prevent ingress of ambient air into the chamber and to prevent escape of the coolant from the chamber.

4. The apparatus of claim 3 wherein the seal lock is in fluid communication with the coolant source, and wherein the coolant provides the pressure.

5. The apparatus of claim 1 wherein the coolant is gaseous nitrogen.

6. The apparatus of claim 1 wherein the coolant is dehumidified air.

* * * * *